United States Patent [19]
Amacker

[11] Patent Number: 5,103,935
[45] Date of Patent: Apr. 14, 1992

[54] TREE STAND WITH TELESCOPING SEAT

[76] Inventor: Joseph A. Amacker, 1212 N. Main St., Delhi, La. 71232

[21] Appl. No.: 498,401

[22] Filed: Mar. 26, 1990

[51] Int. Cl.⁵ .......................... A45F 3/26; A47C 9/10
[52] U.S. Cl. ................................ 182/187; 182/135
[58] Field of Search ............... 182/187, 188, 134, 135, 182/136; 30/382; 108/152; 297/16, 19, 23, 232, 231, 345

[56] References Cited

U.S. PATENT DOCUMENTS

| | | | |
|---|---|---|---|
| 2,567,595 | 9/1951 | Bryant . | |
| 2,797,738 | 7/1957 | Patterson | 297/345 |
| 3,067,975 | 12/1962 | Wilcox . | |
| 3,115,213 | 12/1963 | Cloutier . | |
| 3,129,731 | 4/1964 | Tyrrell | 182/187 |
| 3,419,108 | 12/1968 | Mobbs . | |
| 3,513,940 | 5/1970 | Ussery . | |
| 3,871,482 | 3/1975 | Southard . | |
| 3,955,645 | 5/1976 | Dye | 182/187 |
| 4,060,150 | 11/1977 | Hughes | 182/178 |
| 4,230,296 | 10/1980 | Staley | 182/187 |
| 4,331,216 | 5/1982 | Amacker | 182/187 |
| 4,369,858 | 1/1983 | Babb . | |
| 4,458,782 | 7/1984 | Meyer | 182/187 |
| 4,475,627 | 10/1984 | Eastridge | 182/187 |
| 4,589,522 | 5/1986 | Shelton | 182/187 |
| 4,596,309 | 6/1986 | Venson . | |
| 4,600,082 | 7/1986 | Rauls . | |
| 4,667,773 | 5/1987 | Davis | 182/187 |
| 4,723,630 | 2/1988 | Wolford et al. . | |
| 4,802,552 | 2/1989 | Williams | 182/187 |

*Primary Examiner*—Reinaldo P. Machado
*Attorney, Agent, or Firm*—Wigman & Cohen

[57] ABSTRACT

Apparatus for engaging a tree (e.g. tree stand) or other generally vertical member for supporting a user above the ground is disclosed. The apparatus includes a frame for suppporting the weight of the user, means for gripping said vertical member and platform means for receiving the feet of the user. A seat assembly carried by said support frame, includes a collapsible frame and a seat carried by the collapsible frame, said collapsible frame includes means for adjusting the vertical relationship between the seat and the platform means to accommodate users of different heights.

41 Claims, 2 Drawing Sheets

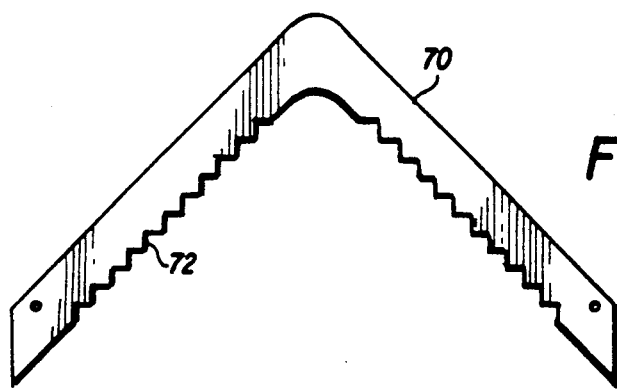
FIG. 5
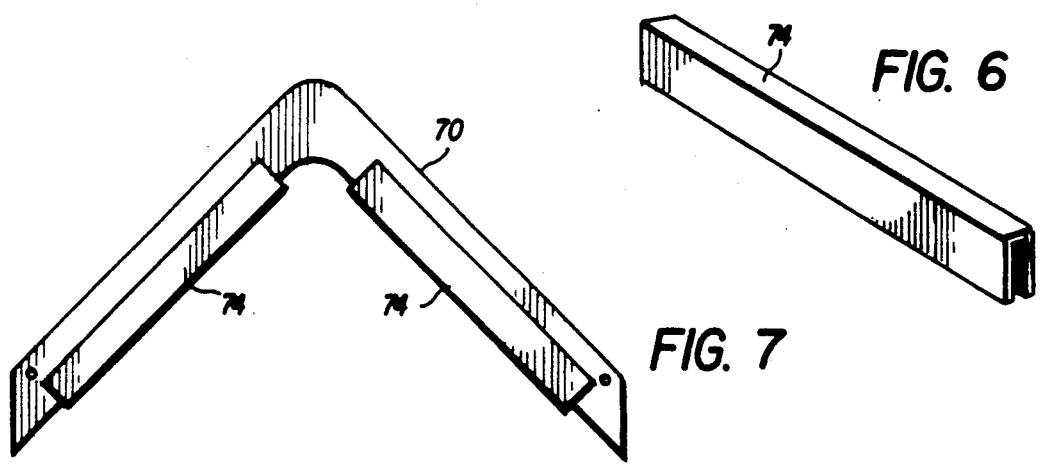
FIG. 6
FIG. 7
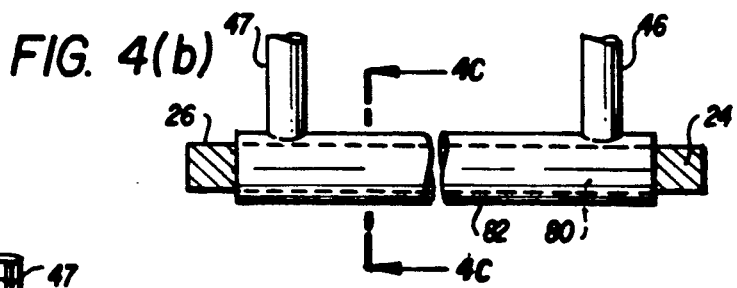
FIG. 4(b)
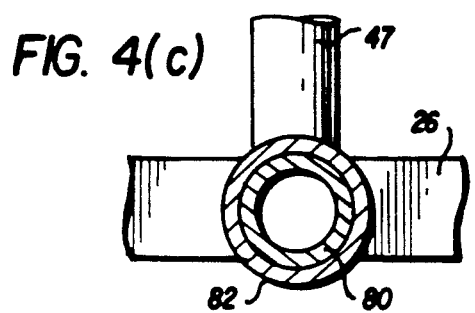
FIG. 4(c)
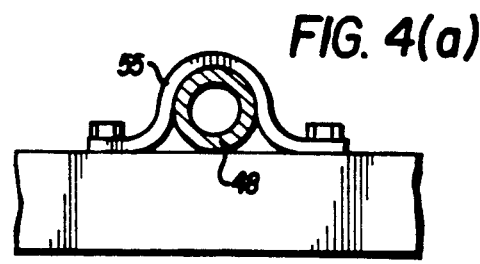
FIG. 4(a)

TREE STAND WITH TELESCOPING SEAT

CROSS-REFERENCE

This application is related to my copending application Ser. No. 07/336,793 filed Apr. 12, 1989, as well as my already issued U.S. Pat. No. 4,331,216.

BACKGROUND OF THE INVENTION

1. Field of the Invention

The present invention relates to new and useful improvements to tree and pole climbing apparatus and, more particularly, to apparatus comprising two climbing members which are alternately raised by the user to reach a desired elevation in a tree or similar structure. Such structures are generally referred to in the art as tree stands.

2. Description of the Prior Art

Hunters, wildlife photographers, and others often seek to climb trees or other vertical members and remain comfortably perched at the desired elevation until an animal emerges. To meet this need, a number of tree and pole climbing structures exist in the prior art. Often, these structures include a seat to accommodate the user who may often remain at the elevation for several hours.

Exemplary patents relating to tree climbing stands which include a seat are:

U.S. Pat. No. 4,331,216 to Amacker;
U.S. Pat. No. 4,475,627 to Eastridge;
U.S. Pat. No. 4,589,522 to Shelton;
U.S. Pat. No. 4,667,773 to Davis: and
U.S. Pat. No. 4,802,552 to Williams.

With each of the disclosed devices, however, the distance between the seat and the platform cannot be varied. Hence, users who are taller or shorter than average are forced to sit uncomfortably crouched or with their feet dangling.

An attempt to obviate the aforementioned problem was described in U.S. Pat. No. 4,458,782 to Meyer. Meyer discloses a tree stand seat construction having a rigid seat 35 which is removably mounted to the diagonal frame members 21, 22. A plurality of holes are provided in the frame to allow the seat position to be upwardly or downwardly adjusted. However, a significant disadvantage of this device is the fact that as the height of the seat relative to the platform is varied, the distance between the seat and the tree is also varied. Hence, adjustment to fit the height of the individual user is quite limited.

In the Eastridge, Davis, Williams and Shelton patents noted herein the seat is hingedly secured to the platform by means of pin or bolt members. Each of the pins or bolts extend through holes provided in the chair legs which support the seat. In time, the pins buckle or the ends of the legs break off, rendering the stand unsafe or useless. Moreover, this seat arrangement does not provide enough friction to allow the seat to be positioned upright by itself without requiring the tree for support.

It would therefore be desirable to provide a tree climbing stand having a seat construction which can be easily adjusted to suit the height of the user and which has a safe, secure, strong, and effective means for securing the seat to the platform.

SUMMARY AND OBJECTS OF THE INVENTION

In view of the foregoing, it should be apparent that a need still exists in the art for a tree stand that avoids the problems inherent in the prior art structures and which will allow its use to sit comfortably while perched in the tree.

Accordingly, it is a primary object of this invention to provide a tree climbing stand which is compact, rugged, safe, portable, and convenient to operate in the field.

Another object of this invention is to provide a tree climbing stand provided with a seat which may be easily adjusted to suit the height of the user.

Yet another object of this invention is to provide a tree climbing stand of the aforesaid type wherein the seat can be easily removed at the discretion of the user.

A further object of the present invention is to provide a tree climbing stand of the aforesaid type having an improved means for securing the seat to the stand.

These and other objects and advantages that will become apparent hereinafter are accomplished in accordance with the invention by providing a tree climbing stand comprising a lower climbing section. The lower section includes gripping members to engage the tree, a support platform, and a flexible seat construction mounted on the platform by a pillow block, or U-shaped clamp or a sleeve. The distance between the seat and the platform may be varied by telescoping seat legs. The telescoping legs may be locked in place at the desired height using spring-biased locking pins. In another aspect of the invention the seat construction may be completely removed from the support platform for easy storage, transportation or replacement.

The upper section includes gripping means to engage the tree and functions to support the user's arms during climbing.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 4(a) is a side elevational view of the U-shaped clamp embodiment for supporting the seat frame of FIG. 1.

FIG. 4(b) is a front elevational view partly in section of the sleeve embodiment for supporting the seat frame of FIG. 1.

FIG. 4(c) is a side elevational view partly in section of the sleeve embodiment taken along line 4(c) of FIG. 4(b).

FIG. 5 is an elevational view of the serrated gripping wedge.

FIG. 6 is a perspective view of the guard employed with the serrated gripping wedge.

FIG. 7 is an elevational view of the serrated gripping wedge with the guards attached.

DETAILED DESCRIPTION OF THE PREFERRED EMBODIMENTS

Figure 1:
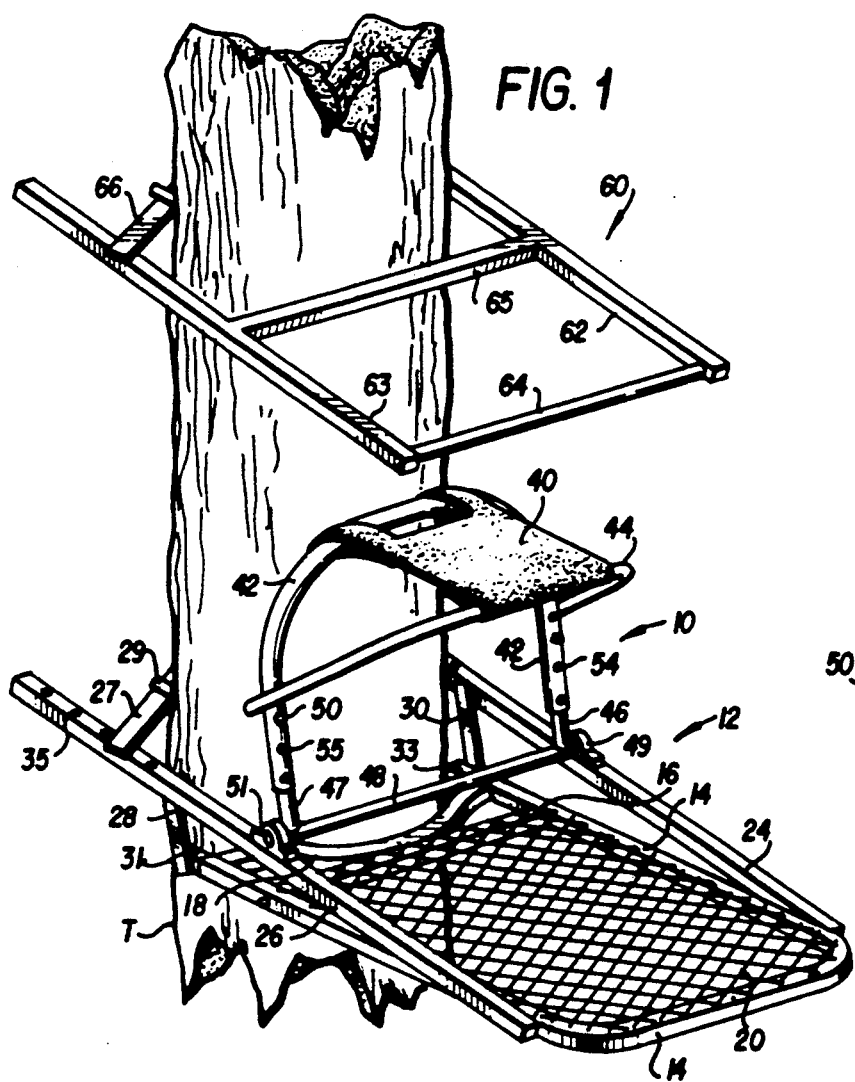
FIG. 1 is a perspective view showing the tree stand of the present invention in use.

Referring now in detail to the drawings wherein like parts are designated by like reference numerals throughout, there is illustrated in FIG. 1 a preferred embodiment of the tree climbing stand of the present invention, designated generally by reference numeral 10, in engagement with a tree T.

As seen in FIG. 1, tree stand 10 includes a lower, seating section or assembly 12 having a generally U-shaped frame 14 preferably formed of aluminum or steel hollow square tubing. A support bar 16 is transversely mounted to frame 14 adjacent the tree. A curved bar 18, which engages the tree or column, is secured at its ends to frame 14 and at its center to support bar 16. An overlying steel mesh 20 is secured to frame 14 and support bar 16 by welding or the like to provide a platform on which a user may stand.

A pair of generally parallel spaced bars 24, 26 are hingedly mounted to opposite sides of frame 14 towards the front end of the frame 14 using conventional pin or bolt construction (not shown). A conventional V-shaped gripping wedge 27 is removably mounted at the opposite ends of spaced bars 24, 26 for securing the stand to the back side of the tree as shown in FIG. 1. A plurality of cleats 29 may be welded to the wedge member 27 to provide the needed penetration into the side of the tree opposite the curved bar 18. Alternatively, gripping wedge 70 provided with serrations, or saw-teeth 72 may be employed (FIG. 5). When weight is applied to the stand, the serrations 72 puncture the bark of tree T to provide additional gripping support for the stand.

When the tree stand is not in use, guards 74, preferably constructed of rubber or plastic may be fitted over the serrations 72, as shown in FIG. 7. The guards comprise an elongated strip having a generally "U" shaped cross-section (FIG. 6). Guards 74 may be formed in one piece, if desired. The guards are particularly useful in those jurisdictions where it is prohibited by law to use tree stands which puncture the bark of trees.

Conventional bolt and wing nuts may be used to secure the wedge 27 or 70 to the spaced bars 24, 26 via apertures 35 provided in bars 24, 26. This construction allows the distance between curved bar 18 and gripping wedge 27 to vary depending on the diameter of tree T.

A pair of struts 28, 30 are pivotably mounted at one end to spaced bars 24, 26, respectively, and at their opposite ends to a pair of telescoping bars 31, 33. The telescoping bars 31, 33 are positioned within and in slidable engagement with each side of U-shaped frame 14 which is hollow. The pivoting spaced bars 24, 26, struts 28, 30, and telescoping bars 31, 33 cooperate to allow the lower assembly 12 to collapse to facilitate ease in transport and storage.

Further details of the gripping cleats, which may be fixed or removable, as well as the telescoping bar arrangement are described in my copending application Ser. No. 07/336,793 and my already issued U.S. Pat. No. 4,331,216, the subject matter of which is incorporated herein by reference.

Figure 2:
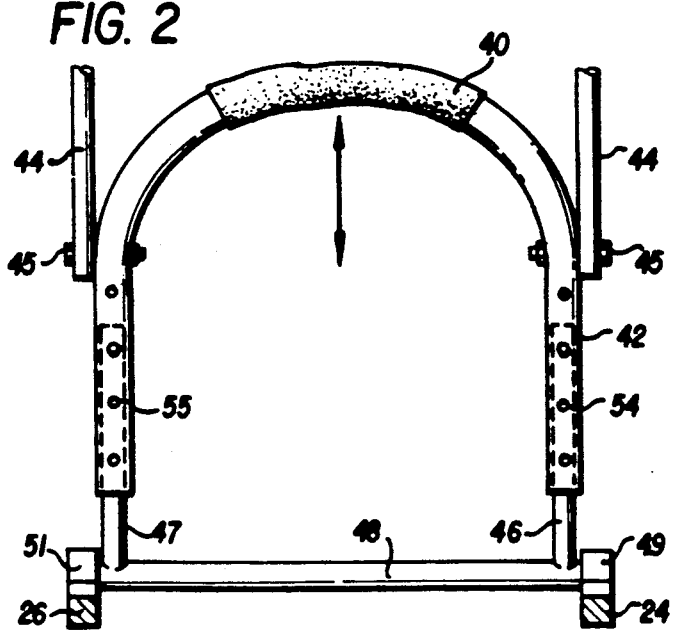
FIG. 2 is a front elevational view showing the telescoping frame for the seat construction of FIG. 1.

The improved seat construction of the present invention includes a seat 40, preferably constructed of canvas, attached at its rearward end to a first tubular U-shaped frame member 42 and at its forward end to a second U-shaped frame member 44 which is pivotably secured to the first U-shaped member 42 at 45 using conventional bolts (FIG. 2). In this manner seat frame members 42 and 44 fold neatly within themselves for ease in transport and storage with the flexible seat 40 positioned therebetween.

As best viewed in FIG. 2, the opposite legs of tubular frame member 42 telescopingly receive vertical tubes 46, 47, which project from a transverse rod 48. Rod 48, in turn, is rotatably secured at opposite ends within pillow blocks 49, 51 mounted on parallel bars 24, 26, respectively.

A second method of mounting the transverse rod 48 may be accomplished by use of generally U-shaped brackets 55, as shown in FIG. 4. Brackets 55 comprise a piece of steel or aluminum curved to accommodate and retain the ends of horizontal member 49, which is less expensive than pillow blocks 49, 51. The brackets 55 are easily mounted to bars 24,26 by bolts, welding, or the like.

A third method of mounting the seat frame to the platform side bars 24, 26 is illustrated in FIGS. 4(b) and (c). Vertical tubular members 46, 47 are welded to a tubular sleeve 82 which surrounds a transverse rod or tube 80 and is rotatable about tube 80. In turn, transverse tube 80 is welded to the logitudinally extending platform bars 24 and 26. Sleve 82 is preferably of a length substantially extending the length of transverse tube 80 such that sleeve 82 generally abuts platform bars 24 and 26. If desired, two short sleeves can be used, each of which is welded to a respective vertical tube 46, 47. A similar construction is shown in U.S. Pat. No. 4,802,552 (FIG. 6). The arrangement of the present invention, however, prevents the seat frame from shifting from side-to-side thereby fixing the seat in the center of the stand where the weight of the user is most evenly distributed. Additionally, by using a one-piece sleeve 82, instead of using the conventional two sleeve arrangement, earlier noted, when the seat of the present invention is removed the distance between vertical tubes 46, 47 is fixed.

As mentioned, one disadvantage of the prior art is the fact that the hinge connection which secures the seat legs to the platform requires bolts which penetrate holes provided in the platform frame and the seat legs. The inclusion of pillow blocks 49, 51, or clamps 55 obviate this disadvantage. Moreover, it will be appreciated that the pillow blocks or clamps are constructed to provide sufficient friction to allow the seat frame to remain upright when it is not resting against the tree and yet will permit rotation of the seat with relative ease for folding purposes. Another disadvantage of the prior art—that the height of the seat cannot be varied—is obviated by providing telescoping frame members in the seat frame construction, which allows the seat to be secured in place at various elevations.

Figure 3B:
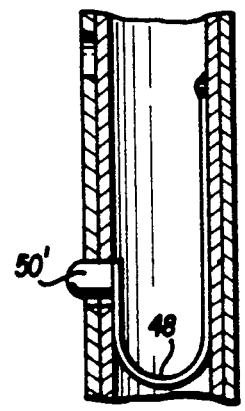
FIG. 3(b) is a view similar to FIG. 3(a) showing an alternative embodiment of the pin.
Figure 3A:
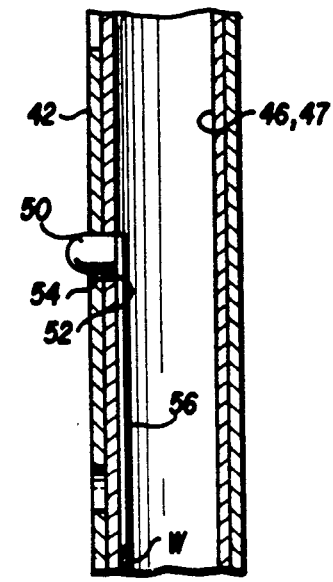
FIG. 3(a) is a side view partially in section of the spring-biased locking pin.

With reference to FIG. 3, locking means, comprising a spring 56, is positioned at its downward end to the inside surfaces of each of the vertical tubes 46, 47. In the embodiment of FIG. 3(a) spring 56 is fixedly in position by suitable means, such as weldment W. At the opposite end of the flat spring 56 is mounted a pin 50. The pin is biased into engagement with aperture 52 provided in each of vertical tubes 46, 47 and one of a plurality of apertures 54, 55 provided in each leg of the U-shaped frame member 42 when the apertures in frame 42 becomes coincident with the apertures of vertical tubes 46, 47, as shown in FIG. 3.

In the embodiment of FIG. 3(b), spring 56 is a unitary push spring such as Valco (of Cleveland, Ohio) No. 0183-250, which is a one-piece U-shaped member in which the pin is integrally formed at one end of the spring. The spring may thus be readily inserted and removed from the vertical tubes 46,47.

To raise, lower, or remove the seat, the user merely depresses pin 50 and slides frame member 42 to the desired selected position represented by one of the drilled apertures. The pin 50 automatically projects the selected aperture and is locked in place.

In the illustrated embodiment, three apertures 54 and three apertures 55 are provided in each of the two legs of frame member 42. The two pairs of three apertures 54,55 are arranged in the legs of frame member 42 with a spacing of 2 inches, and are positioned so as to provide an adjustment of seat 40 above platform 20 at three levels of 20 inches, 24 inches, and 26 inches, respectively, so as to provide a maximum amount of comfort for the stand user when the stand is in position on tree T, with the seat in the upright, or erected position.

To allow the seat 40 and frame members 42 and 44 to fold down flat for ease in transport and storage, vertical tubular members 46, 47 are mounted to a horizontal member 48 which is rotatably secured within pillow or bearing blocks 49, 51.

An additional advantage provided by the aforementioned structure lies in the fact that the seat 40, together frame members 42 and 44 ma be readily removed from frame 14, allowing more flexibility in the use of the stand.

An upper frame 60 is provided for climbing and descending the tree or pole. Upper frame 60 is constructed of a pair of parallel side bars 62, 63 spaced by a pair of cross bars 64, 65 and a gripping wedge 66. The manner of use of upper and lower frames for climbing are described in my U.S. Pat. No. 4,331,216, at columns 6 and 7, which is incorporated herein by reference.

Although only preferred embodiments are specifically illustrated and described herein, it will be appreciated that many modifications and variations of the present invention are possible in light of the above teachings and within the perview of the appended claims without departing from the spirit and intended scope of the invention.

What is claimed is:

1. Apparatus for engaging a tree or other generally vertical member for supporting a user above the ground, comprising:
    a frame for supporting the weight of the user, said frame including means for gripping said vertical member and platform means for receiving the feet of the user;
    a seat assembly carried by said support frame, said seat assembly including a rotatable collapsible frame and a seat carried by said collapsible frame, said collapsible frame including a pair of spaced telescoping male and female tubular members rotatably fixed to said support frame for adjusting the vertical relationship between the seat and the platform means while at the same time keeping constant the distance of said tubular members to the tree; said telescoping member comprising a spring biased protruding pin for releaseably locking said members, whereby users of different heights may be comfortably seated when said apparatus is in position for supporting said user above the ground.

2. The apparatus of claim 1, wherein said seat assembly collapsible frame includes a pair of generally U-shaped members each having a plurality of legs and a portion bridging said legs, the bridging portion of said members carrying opposite ends of a flexible seat, each leg of one of said U-shaped members being pivotally secured to a leg of the other U-shaped member wherein one of the two U-shaped members may be rotated upwardly to envelope the other U-shaped member and thereby collapse the seat.

3. The apparatus of claim 2, wherein said seat adjusting means comprise telescoping male and female tubular members.

4. The apparatus of claim 3, wherein said seat adjusting means includes locking means for securing the telescoping tubular members at a desired elevation.

5. The apparatus of claim 4 wherein said locking means comprises corresponding apertures in said tubular members and a spring-biased pin releasably protruding from said apertures.

6. The apparatus of claim 5 wherein said spring is a flat spring, one end of said flat spring being mounted at one end to the inner surface of said male tubular member, the opposite end of said flat spring carrying said pin for projecting through said aperture of said male tubular members.

7. The apparatus of claim 1, wherein said seat assembly collapsible frame includes an upstanding inverted U-shaped member, a transverse rod carrying said inverted U-shaped member, said transverse rod being longer than the distance between the legs of said inverted U-shaped member, means carried by the supporting frame for rotatably receiving the oppositely directed free ends of said transverse member, whereby said seat assembly can be rotated into a collapsed condition.

8. The apparatus of claim 7, wherein said rotating means carried by the supporting frame is a pillow block.

9. The apparatus of claim 7, wherein said rotating means carried by the supporting frame is a U-shaped bracket.

10. Apparatus according to claim 2 wherein said gripping means is wedge shape, each section off said wedge having said serrations.

11. The apparatus of claim 2 further comprising guard means removably mounted to said gripping means for covering said serrations.

12. The apparatus of claim 11, wherein said guard means has a generally "U" shaped cross-section.

13. The apparatus of claim 12, wherein said guard means comprises two elongated members with a generally "U" shaped cross-section, each of which fits over a respective serrated portion of said gripping means.

14. Apparatus for engaging a tree or other generally vertical member for supporting a user above the ground, comprising:
    a frame for supporting the weight of the user, said frame including means for gripping said vertical member and platform means for receiving the feet of the user;
    a seat assembly carried by said support frame, said seat assembly including a collapsible frame and a seat carried by said collapsible frame, said collapsible frame including means for adjusting the vertical relationship between the seat and the platform means, whereby users of different heights may be comfortably seated when said apparatus is in position for supporting said user above the ground; said seat assembly collapsible frame includes an upstanding inverted U-shaped member, a transverse rod carrying said inverted U-shaped member, said transverse rod being longer than the distance between the legs of said inverted U-shaped member, means carried by the supporting frame for rotatably receiving the oppositely directed free ends of said transverse member, whereby said seat assembly can be rotated into a collapsed condition.

15. The apparatus of claim 14, wherein said transverse rod carrying means is a pillow block.

16. The apparatus of claim 14, wherein said transverse rod carrying means is a U-shaped bracket.

17. Apparatus for engaging a tree or other generally vertical member for supporting a user above the ground, comprising:
- a frame for supporting the weight of the user, said frame including means for gripping said vertical member and platform means for receiving the feet of the user;
- a seat assembly carried by said support frame, said seat assembly including a collapsible frame and a seat carried by said collapsible frame, said collapsible frame including means for adjusting the vertical relationship between the seat and the platform means, whereby users of different heights may be comfortably seated when said apparatus is in position for supporting said user above the ground; said seat assembly collapsible frame includes a pair of generally U-shaped members each having a plurality of legs and a portion bridging said legs, the bridging portion of said members carrying opposite ends of a flexible seat, each leg of one of said U-shaped members being pivotally secured to a leg of the other U-shaped member wherein one of the two U-shaped members may be rotated upwardly to envelope the other U-shaped member and thereby collapse the seat; a transverse rod carrying one of said U-shaped members, said transverse rod being longer than the distance between the legs of said U-shaped member, means carried by the supporting frame for rotatably receiving the oppositely directed free ends of said transverse member, whereby said seat assembly can be rotated into a collapsible condition.

18. The apparatus of claim 17, wherein said rotating means carried by the supporting frame is a pillow block.

19. The apparatus of claim 17, wherein said rotating means carried by the supporting frame is a U-shaped bracket.

20. Apparatus for engaging a tree or other generally vertical member for supporting a user above the ground, comprising:
- a frame for supporting the weight of the user, said frame including means for gripping said vertical member and platform for receiving the feet of the user;
- a seat assembly carried by said support frame, said seat assembly including a collapsible frame and a seat carried by said collapsible frame, said collapsible frame including a generally U-shaped member with a pair of vertical legs each of which terminates at a transverse bar rotatably supported by said supporting frame.

21. The apparatus of claim 20, wherein said seat assembly collapsible frame includes an upstanding inverted U-shaped member, a transverse rod carrying said inverted U-shaped member, said transverse rod being longer than the distance between the legs of said inverted U-shaped member, means carried by the supporting frame for rotatably receiving the oppositely directed free ends of said transverse member, whereby said seat assembly can be rotated into a collapsed condition.

22. The apparatus of claim 20, wherein said seat assembly collapsible frame includes an upstanding inverted U-shaped member, a transverse rod carrying said inverted U-shaped member, said transverse rod being longer than the distance between the legs of said inverted U-shaped member, means carried by the supporting frame for rotatably receiving the oppositely directed free ends of said transverse member, whereby said seat assembly can be rotated into a collapsed condition.

23. The apparatus of claim 20, wherein said seat assembly collapsible frame includes an upstanding inverted U-shaped member, a transverse rod carrying said inverted U-shaped member, said transverse rod being longer than the distance between the legs of said inverted U-shaped member, means carried by the supporting frame for rotatably receiving the oppositely directed free ends of said transverse member, whereby said seat assembly can be rotated into a collapsed condition.

24. The apparatus of claim 21, wherein said rotating means carried by the supporting frame is a pillow block.

25. The apparatus of claim 22, wherein said rotating means carried by the supporting frame is a pillow block.

26. The apparatus of claim 23, wherein said rotating means carried by the supporting frame is a pillow block.

27. The apparatus of claim 21, wherein said rotating means carried by the supporting frame is a U-shaped bracket.

28. The apparatus of claim 22, wherein said rotating means carried by the supporting frame is a U-shaped bracket.

29. The apparatus of claim 23, wherein said rotating means carried by the supporting frame is a U-shaped bracket.

30. The tree stand of claim 20 wherein said seat height adjusting means comprises means for positioning the seat at three distinct heights relative to the platform when said seat is moved said second position.

31. The apparatus of claim 20 wherein said collapsible frame further includes means for adjusting the vertical relationship between the seat and the platform means, whereby users of different heights may be comfortably seated when said apparatus is in position for supporting said user above the ground.

32. The apparatus of claim 20, wherein said seat adjusting means comprise telescoping male and female tubular members and spring operated locking means for securing the telescoping tubular members at a desired elevation.

33. The apparatus of claim 20, wherein said collapsible frame transverse member is directly carried by said supporting frame; and means carried by said supporting frame for receiving said collapsible transverse member.

34. The apparatus of claim 20, wherein said collapsible frame transverse member is indirectly carried by said supporting frame.

35. The apparatus of claim 34, wherein said supporting frame includes a fixed traverse member; said collapsible frame transverse member being coaxial with said supporting frame transverse member to permit relative rotation of the said members for positioning and storing said seat.

36. The apparatus of claim 33, wherein said means carried by said supporting frame for receiving said collapsible frame transverse member is a bracket.

37. The apparatus of claim 33, wherein said means carried by said supporting frame for receiving said collapsible frame transverse member is a pillow block.

38. The apparatus of claim 20, further including wedge shape gripping means for securing said supporting frame to said vertical member, said gripping means including two sections, each of which is formed with serrations for penetrating said vertical member.

39. The apparatus of claim 32, wherein said spring operated locking means comprises confronting apertures in said tubular member and a spring-biased pin protruding from said aperture whereby the user can depress the pin and disengage said tubular members for vertical adjustment of said seat.

40. Apparatus for engaging a tree or other generally vertical member for supporting a user above the ground, comprising:
a frame for supporting the weight of the user, said frame including means for gripping said vertical member and platform means for receiving the feet of the user;
a seat assembly carried by said support frame, said seat assembly including a collapsible frame and a seat carried by said collapsible frame, said collapsible frame including means for adjusting the vertical relationship between the seat and the platform means, whereby users of different heights may be comfortably seated when said apparatus is in position for supporting said user above the ground;
said support frame comprises a tubular bar transversely affixed to said supporting frame, said seat assembly frame further including a tubular sleeve surrounding said supporting frame tubular bar and rotatable in relation thereto, wherein said seat assembly collapsible frame is mounted to said sleeve such that said seat assembly is pivotable in relation to said support frame.

41. The apparatus of claim 40, wherein each side of said sleeve extends substantially the width of said support frame thereby reducing lateral shifting of said seat assembly.

* * * * *